US011982786B2

United States Patent
Kim et al.

(10) Patent No.: US 11,982,786 B2
(45) Date of Patent: May 14, 2024

(54) MOBILE DEVICE FOR MEASURING AMOUNT OF SNOWFALL AND METHOD OF CONTROLLING THE SAME

(71) Applicant: National Institute of Meteorological Sciences, Seogwipo-si (KR)

(72) Inventors: Yoo Jun Kim, Gangneung-si (KR); Bo Yeong Ahn, Gangneung-si (KR)

(73) Assignee: NATIONAL INSTITUTE OF METEOROLOGICAL SCIENCES, Seogwipo-si (KR)

( * ) Notice: Subject to any disclaimer, the term of this patent is extended or adjusted under 35 U.S.C. 154(b) by 0 days.

(21) Appl. No.: 17/953,126

(22) Filed: Sep. 26, 2022

(65) Prior Publication Data
US 2023/0116186 A1    Apr. 13, 2023

(30) Foreign Application Priority Data
Oct. 12, 2021 (KR) .......................... 10-2021-0135111

(51) Int. Cl.
*G01W 1/14* (2006.01)
*G01B 3/04* (2006.01)
*G01B 11/06* (2006.01)
*G01B 11/22* (2006.01)

(52) U.S. Cl.
CPC ................. *G01W 1/14* (2013.01); *G01B 3/04* (2013.01); *G01B 11/0608* (2013.01); *G01B 11/0691* (2013.01); *G01B 11/22* (2013.01); *Y02A 90/10* (2018.01)

(58) Field of Classification Search
CPC ....... G01W 1/14; G01B 3/04; G01B 11/0608; G01B 11/0691; G01B 11/22; Y02A 90/10
USPC .......................................................... 73/170
See application file for complete search history.

(56) References Cited

U.S. PATENT DOCUMENTS 11,701,972 B1 * 7/2023 Chrysanthakopoulos ...................
H02S 10/40
701/22

FOREIGN PATENT DOCUMENTS

| CN | 108398074 | A | * | 8/2018 | |
|---|---|---|---|---|---|
| CN | 207706094 | U | * | 8/2018 | ............. H02S 10/40 |
| CN | 108801161 | A | * | 11/2018 | |
| CN | 109853451 | A | * | 6/2019 | |
| CN | 110387855 | B | * | 9/2021 | |
| EP | 2551668 | A2 | * | 1/2013 | |

(Continued)

OTHER PUBLICATIONS

Translation CN-110387855 (Year: 2021).*

(Continued)

*Primary Examiner* — Peter J Macchiarolo
*Assistant Examiner* — Monica S Young
(74) *Attorney, Agent, or Firm* — CANTOR COLBURN LLP

(57) ABSTRACT

Provided are a device for measuring the amount of snowfall and a method of controlling the same, the device including a bottom plate, a graduated ruler extending upward from the bottom plate, an image capturing unit configured to capture an image of the graduated ruler and an upper portion of snow deposited on the bottom plate by using an image capturing device, a measurement unit configured to measure the amount of snowfall based on information on the captured image, and a movement unit configured to move the device for measuring the amount of snowfall so that a position of the bottom plate moves from a first position to a second position.

6 Claims, 10 Drawing Sheets

(56) References Cited

FOREIGN PATENT DOCUMENTS

| | | | | |
|---|---|---|---|---|
| JP | H10268068 | A | * | 3/1998 |
| JP | 4637216 | B2 | * | 2/2011 |
| JP | 2019094699 | A | * | 6/2019 |
| KR | 20130071758 | A | * | 12/2011 |
| KR | 101552949 | | | 9/2015 |
| KR | 102204206 | B1 | * | 10/2020 |
| KR | 20230079592 | A | * | 11/2021 |
| KR | 102604845 | B1 | * | 1/2023 |

OTHER PUBLICATIONS

Translation CN-207706094 (Year: 2018).*
Translation JP-H10268068 (Year: 1998).*
Translation CN-108398074 (Year: 2018).*
Translation CN-109853451 (Year: 2019).*

* cited by examiner

MOBILE DEVICE FOR MEASURING AMOUNT OF SNOWFALL AND METHOD OF CONTROLLING THE SAME

BACKGROUND

Field

The present application relates to a mobile device for measuring the amount of snowfall and a method of controlling the same.

Description of the Related Art

Snow gauges including ultrasonic snow gauges, laser snow gauges, and CCTV snow gauges, which are currently used at normal times in unmanned meteorological stations, cause reduced quality of snowfall measurement data because of measurement errors of measurement devices such as optical sensors.

In addition, the current device for measuring the amount of snowfall has a problem in that deposited snow is not appropriately removed after the measurement, which degrades accuracy during a subsequent measurement process.

In addition, if a meteorological observation device is not properly installed in a rugged terrain, it is difficult to measure the amount of regional snowfall.

There is a need for a system for measuring the amount of snowfall that accurately and repeatedly measures the amount of snowfall in response to an accelerating climatic change.

The background art of the present application is disclosed in Korean Patent No. 10-1552949.

SUMMARY

The present application has been made in an effort to solve the above-mentioned problems in the related art, and an object of the present application is to provide a device for measuring the amount of snowfall and a method of controlling the same, which are capable of solving a problem that reliability of a subsequently measured value deteriorates because of snow remaining on a measurement table after the amount of snowfall is measured.

The present application has been made in an effort to solve the above-mentioned problems in the related art, and an object of the present application is to provide a device for measuring the amount of snowfall and a method of controlling the same, which are capable of solving a problem that it is difficult to measure the amount of regional snowfall in a rugged region in which no snowfall amount observation facility is appropriately installed.

However, technical problems to be solved by the exemplary embodiment of the present application are not limited to the aforementioned technical problem, and other technical problems may be present.

According to an aspect of the present application, there is provided a device for measuring the amount of snowfall, the device including: a bottom plate; a graduated ruler extending upward from the bottom plate; an image capturing unit configured to capture an image of the graduated ruler and an upper portion of snow deposited on the bottom plate by using an image capturing device; a measurement unit configured to measure the amount of snowfall based on information on the captured image; and a movement unit configured to move the device for measuring the amount of snowfall so that a position of the bottom plate moves from a first position to a second position.

According to the embodiment of the present application, the movement unit may include: one or more wheels; and a wheel driving unit configured to drive the wheels, and the device for measuring the amount of snowfall may further include a battery unit configured to supply power to at least one of the image capturing unit, the measurement unit, and the movement unit.

According to the embodiment of the present application, the device may further include at least one solar module, in which the battery unit is charged by the solar module.

According to the embodiment of the present application, the device may further include: a rotation driving unit configured to rotate the bottom plate about a rotation axis so that snow deposited on the bottom plate falls downward; and a body unit including a bottom part, and a plurality of lateral parts extending from the bottom part, the body unit being configured to accommodate the snow falling in a space defined by the bottom part and the lateral parts.

According to the embodiment of the present application, the device may further include a lateral driving unit configured to rotate the lateral part in a preset direction and by a preset angle about a tangential line between the bottom part and the lateral part.

According to another aspect of the present application, there is provided a method of measuring the amount of snowfall, the method including: capturing, by an image capturing unit, an image of an upper portion of snow deposited on a bottom plate and a graduated ruler extending upward from the bottom plate by using an image capturing device; measuring, by a measurement unit, the amount of snowfall based on information on the captured image; and moving, by a movement unit, a device for measuring the amount of snowfall so that a position of the bottom plate moves from a first position to a second position.

The technical solution is just illustrative but should not be interpreted as being intended to limit the present application. In addition to the above-mentioned exemplary embodiment, additional exemplary embodiments may be present in the drawings and the detailed description of the invention.

According to the technical solution of the present application, the device for measuring the amount of snowfall may move to the observation position and measure the amount of snowfall, which makes it possible to measure the amount of snowfall even at a location where it is difficult to measure the amount of snowfall.

According to the technical solution of the present application, it is possible to remove the deposited snow by rotating the bottom plate, which makes it possible to improve the reliability of the measured value of the amount of snowfall during the subsequent measurement process.

However, the effects, which can be obtained by the present application, are not limited to the above-mentioned effects, and other effects may be present.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
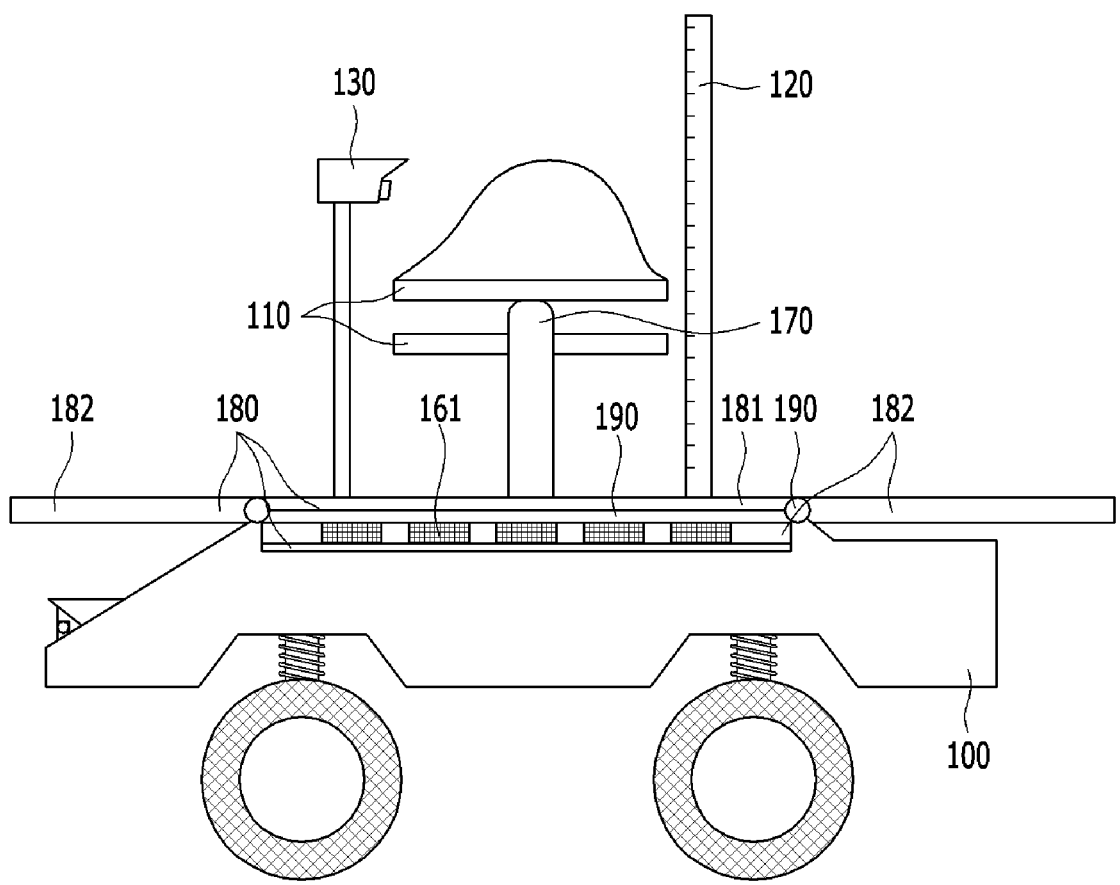
FIG. 1 is a schematic configuration view of a device for measuring the amount of snowfall according to an embodiment of the present application.

Hereinafter, exemplary embodiments of the present application will be described in detail with reference to the accompanying drawings so that those with ordinary skill in the art to which the present application pertains may easily carry out the exemplary embodiments. However, the present application may be implemented in various different ways, and is not limited to the exemplary embodiments described herein. A part irrelevant to the description will be omitted in the drawings in order to clearly describe the present application, and similar constituent elements will be designated by similar reference numerals throughout the specification.

Throughout the specification of the present application, when one constituent element is referred to as being "connected to" another constituent element, one constituent element can be "directly connected to" the other constituent element, and one constituent element can also be "electrically connected to" or "indirectly connected to" the other element with other elements therebetween.

Throughout the specification, when one member is disposed "on", "at an upper side of", "at an upper end of", "below", "at a lower side of", or "at a lower end of" another member in the present specification of the present application, this includes not only a case where one member is brought into contact with another member, but also a case where still another member is present between the two members.

Throughout the specification of the present application, unless explicitly described to the contrary, the word "comprise" or "include" and variations, such as "comprises", "comprising", "includes" or "including", will be understood to imply the inclusion of stated constituent elements, not the exclusion of any other constituent elements.

FIG. 1 is a schematic configuration view of a device for measuring the amount of snowfall according to an embodiment of the present application.

Referring to FIG. 1, a device 100 for measuring the amount of snowfall may essentially include: a bottom plate 110; a graduated ruler 120 extending upward from the bottom plate 110; an image capturing unit 130 configured to capture an image of the graduated ruler 120 and an upper portion of snow deposited on the bottom plate 110 by using an image capturing device; a measurement unit 140 configured to measure the amount of snowfall based on information on the captured image; and a movement unit 150 configured to move the device 100 for measuring the amount of snowfall so that a position of the bottom plate 110 moves from a first position to a second position.

In addition, the movement unit 150 includes one or more wheels, and a driving unit configured to operate the wheels. The device 100 for measuring the amount of snowfall may further include a battery unit 160 configured to supply power to at least one of the image capturing unit 130, the measurement unit 140, and the movement unit 150. The device 100 for measuring the amount of snowfall may further include at least one solar module 161. The battery unit 160 may be charged by the solar module 161. The device 100 for measuring the amount of snowfall may further include: a rotation driving unit 170 configured to rotate the bottom plate 110 about a rotation axis so that snow deposited on the bottom plate 110 falls downward; and a body unit 180 including a bottom part 181 and a plurality of lateral parts 182 extending from the bottom part 181, the body unit 180 being configured to accommodate snow falling in a space defined by the bottom part 181 and the lateral parts 182. The device 100 for measuring the amount of snowfall may further include a lateral driving unit 190 configured to rotate the lateral part 182 in a preset direction and by a preset angle about a tangential line between the bottom part 181 and the lateral part 182.

According to the embodiment of the present application, the device 100 for measuring the amount of snowfall may provide a snowfall amount measurement menu to a user terminal (not illustrated). For example, the user terminal (not illustrated) may download and install an application program provided by the device 100 for measuring the amount of snowfall, and the snowfall amount measurement menu may be provided through the installed application.

The device 100 for measuring the amount of snowfall may include all types of servers, terminals, or devices that transmit or receive data, contents, and various types of communication signals to or from the user terminal (not illustrated) through networks and have functions of storing and processing data.

The user terminal (not illustrated) may be a device that operates in conjunction with the device 100 for measuring the amount of snowfall through a network. For example, the user terminal may be all types of wireless communication devices such as a smartphone, a smart pad, a tablet PC, a wearable device, a personal communication system (PCS), a global system for mobile communication (GSM), a personal digital cellular (PDC), a personal handy phone system (PHS), a personal digital assistant (PDA), an international mobile telecommunication (IMT)-2000, a code division multiple access (CDMA)-2000, a W-code division multiple access (W-CDMA), a wireless broadband internet (Wibro) terminal, and a stationary terminal such as a desktop computer and a smart TV.

Examples of the network for sharing information between the device 100 for measuring the amount of snowfall and the user terminal (not illustrated) may include, but not limited to, the 3rd generation partnership project (3GPP) network, the long-term evolution (LTE) network, the 5G network, the world interoperability for microwave access (WIMAX) network, the wired or wireless Internet, the local area network (LAN), the wireless local area network (Wireless LAN), the wide area network (WAN), the personal area network (PAN), the Bluetooth network, the Wi-Fi network, the near field communication (NFC) network, the satellite broadcast network, the analog broadcast network, the digital multimedia broadcasting (DMB) network, or the like.

Figure 2A:
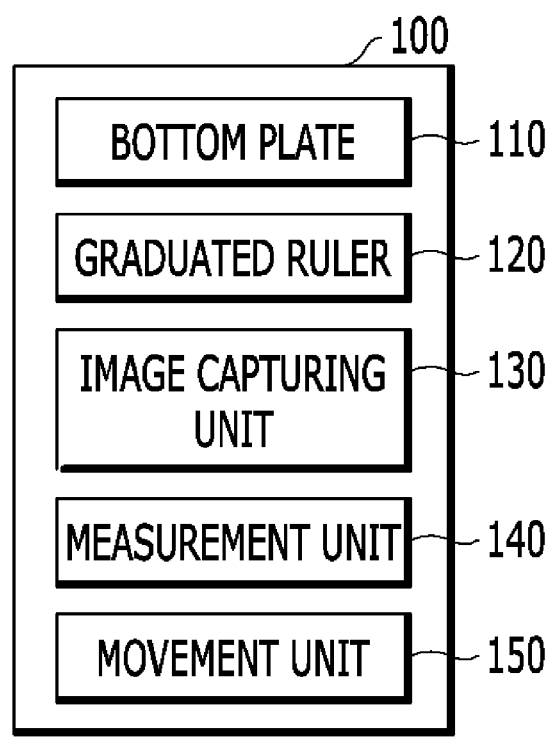
FIG. 2A is a schematic block diagram related to essential components of the device for measuring the amount of snowfall according to the embodiment of the present application.

FIG. 2A is a schematic block diagram related to essential components of the device 100 for measuring the amount of snowfall according to the embodiment of the present application.

Referring to FIG. 2A, the device 100 for measuring the amount of snowfall may include, as the essential components, the bottom plate 110, the graduated ruler 120, the image capturing unit 130, the measurement unit 140, and the movement unit 150.

The device 100 for measuring the amount of snowfall according to the embodiment of the present application may include the bottom plate 110.

For example, the bottom plate 110 may be flat so that the amount of snowfall may be measured. The bottom plate 110 may have a circular or polygonal shape. The bottom plate 110 may include a contact sensor, a temperature sensor, or the like to detect snow deposited on an upper portion of the bottom plate 110. The bottom plate 110 may be transparent. The image capturing device may be provided on the lower portion of the bottom plate 110 so that a lens is directed toward an upper portion of the bottom plate 110 on which snow may be deposited. A heating wire may be embedded in the bottom plate 110 and melt the snow deposited on the bottom plate 110. A material of the bottom plate 110 may be one or more of glass, synthetic resin, wood, and metal. A vibration member may be embedded in the bottom plate 110 and apply vibration to remove the snow deposited on the bottom plate 110. The bottom plate 110 may include a first bottom plate 111 and a second bottom plate 112. The first and second bottom plates 111 and 112 are provided symmetrically with respect to the rotation driving unit 170. The first and second bottom plates 111 and 112 rotate about the rotation axis, such that the snow deposited on an upper portion of the first bottom plate 111 or the second bottom plate 112 may be removed.

The device 100 for measuring the amount of snowfall according to the embodiment of the present application may include the graduated ruler 120 extending upward from the bottom plate 110.

For example, the graduated ruler 120 may be maximum 100 cm. A bottom portion of the graduated ruler 120 may be positioned at an end of the upper portion of the bottom plate 110. The bottom portion of the graduated ruler 120 may be positioned on an upper surface of the bottom plate 110. The graduated ruler 120 may have graduations and symbols or Arabic numerals corresponding to heights corresponding to the graduations.

The device 100 for measuring the amount of snowfall according to the embodiment of the present application may include the image capturing unit 130 configured to capture an image of the graduated ruler 120 and an upper portion of the snow deposited on the bottom plate 110 by using the image capturing device.

For example, a distance between the image capturing unit 130 and the graduated ruler 120 may be a distance that enables the image capturing unit 130 to capture images of a lowermost graduation and an uppermost graduation of the graduated ruler 120. When a height of the deposited snow is 0 cm, the image capturing unit 130 may capture an image of the bottom plate 110 and the graduation corresponding to 0 cm of the graduated ruler 120. When a height of the deposited snow is 100 cm, the image capturing unit 130 may capture an image of the upper portion of the snow deposited on the bottom plate 110 and the graduation corresponding to 100 cm. The image capturing unit 130 may capture the image of the upper portion of the snow deposited on the bottom plate 110 and the graduated ruler 120 for a preset time.

The device 100 for measuring the amount of snowfall according to the embodiment of the present application may include the measurement unit 140 configured to measure the amount of snowfall based on information on the captured image.

For example, the measurement unit 140 may measure the amount of snowfall by performing image processing on the information on the image of the graduated ruler 120 and the upper portion of the snow deposited on the bottom plate 110. The measurement unit 140 may analyze the image information, recognize the graduated ruler 120 of an uppermost portion of the snow deposited on the bottom plate 110, and convert the image information into a binarized image. The measurement unit 140 may analyze the binarized image, recognize the upper portion of the snow, recognize the graduation of the graduated ruler 120 corresponding to the upper portion of the snow, recognize the Arabic numeral corresponding to the graduation, and convert the recognized upper portion of the snow into the amount of snowfall.

The device 100 for measuring the amount of snowfall according to the embodiment of the present application may include the movement unit 150 configured to move the device 100 for measuring the amount of snowfall so that the position of the bottom plate 110 moves from the first position to the second position.

For example, the movement unit 150 may move the device 100 for measuring the amount of snowfall by using a movement means provided on the device 100 for measuring the amount of snowfall so that the position of the bottom plate 110 moves from the first position to the second position. The movement means is not limited to a vehicle illustrated in FIG. 1, and examples of the vehicle may include amphibious vehicles, ships, and drones.

The device 100 for measuring the amount of snowfall according to the embodiment of the present application may include a snow removing unit (not illustrated) configured to push out the deposited snow to the outside of the bottom plate 110 while moving in a direction from one side to the other side of the bottom plate 110.

For example, the snow removing unit (not illustrated) may push out the deposited snow to the outside of the bottom plate 110 while moving in the direction from one side to the other side of the bottom plate 110 for a preset time. The snow removing unit (not illustrated) may push out the deposited snow to the outside of the bottom plate 110 while moving in the direction from one side to the other side of the bottom plate 110 a preset number of times for a preset time. The device 100 for measuring the amount of snowfall may further include a vibration unit (not illustrated) configured to apply vibration to the bottom plate 110 by using the vibration member provided in the bottom plate 110. The vibration unit may apply vibration to the bottom plate 110 by using the vibration member provided in the bottom plate 110 while the snow removing unit (not illustrated) moves in the direction from one side to the other side of the bottom plate 110. The device 100 for measuring the amount of snowfall may further include a heating wire unit (not illustrated) configured to apply heat with a preset temperature to the upper portion of the bottom plate 110 by using the heating wire provided in the bottom plate 110. The heating wire unit may apply heat with a preset temperature to the upper portion of the bottom plate 110 by using the heating wire provided in the bottom plate 110 while the snow removing unit (not illustrated) moves in the direction from one side to the other side of the bottom plate 110.

In addition, the snow removing unit (not illustrated) may be provided on at least one of the first and second bottom plates 111 and 112. The position at which the snow removing unit is provided may be positioned above a surface of the bottom plate 110 on which snow is deposited. A first snow removing unit (not illustrated) may be positioned above the surface of the first bottom plate 111 on which snow is deposited. A second snow removing unit (not illustrated) may be positioned above the surface of the second bottom plate 112 on which snow is deposited.

According to the embodiment of the present application, the device 100 for measuring the amount of snowfall may further include an arm unit (not illustrated) having one side end connected to the snow removing unit (not illustrated) and the other side end connected to a driving unit (not illustrated).

For example, one side end of a first arm unit (not illustrated) may be connected to the first snow removing unit (not illustrated), the other side end of the first arm unit may be connected to a first driving unit (not illustrated), one side end of a second arm unit (not illustrated) may be connected to a portion of the first snow removing unit (not illustrated), which is not connected to the first arm unit (not illustrated), and the other side end of the second arm unit may be connected to a second driving unit (not illustrated). In addition, one side end of a third arm unit (not illustrated) may be connected to the second snow removing unit (not illustrated), the other side end of the third arm unit may be connected to a third driving unit (not illustrated), one side end of a fourth arm unit (not illustrated) may be connected to a portion of the second snow removing unit (not illustrated), which is not connected to the third arm unit (not illustrated), and the other side end of the fourth arm unit may be connected to a fourth driving unit (not illustrated).

In addition, the arm unit (not illustrated) may be provided on at least one of the first and second bottom plates 111 and 112 and positioned on a surface of the bottom plate 110 on which snow is not deposited. At least one of the first arm unit (not illustrated) and the second arm unit (not illustrated) may be provided on the surface of the first bottom plate 111 on which snow is not deposited. The first snow removing unit (not illustrated) may be connected to at least one of the first arm unit (not illustrated) and the second arm unit (not illustrated). At least one of the third arm unit (not illustrated) and the fourth arm unit (not illustrated) may be provided on the surface of the second bottom plate 112 on which snow is not deposited. The second snow removing unit (not illustrated) may be connected to at least one of the third arm unit (not illustrated) and the fourth arm unit (not illustrated).

According to the embodiment of the present application, the device 100 for measuring the amount of snowfall may further include the driving unit (not illustrated) positioned on the lower portion of the bottom plate 110 and configured to move the arm unit (not illustrated) to move the snow removing unit (not illustrated).

For example, the first driving unit (not illustrated) may be positioned on the lower portion of one side of the first bottom plate 111 and move the first arm unit (not illustrated) to move the snow removing unit (not illustrated). The second driving unit (not illustrated) may be positioned on the lower portion of the other side of the first bottom plate 111 and move the second arm unit (not illustrated) to move the snow removing unit (not illustrated). The movement of the first arm unit (not illustrated) by the first driving unit (not illustrated) and the movement of the second arm unit (not illustrated) by the second driving unit (not illustrated) may be simultaneously performed in the same direction. The second driving unit (not illustrated) may not move the second arm unit (not illustrated) while the first driving unit (not illustrated) reciprocates the first arm unit (not illustrated) once. The first driving unit (not illustrated) may not move the first arm unit (not illustrated) while the second driving unit (not illustrated) reciprocates the second arm unit (not illustrated) once.

In addition, the third driving unit (not illustrated) may be positioned on the lower portion of one side of the second bottom plate 112 and move the third arm unit (not illustrated) to move the snow removing unit (not illustrated). The fourth driving unit (not illustrated) may be positioned on the lower portion of the other side of the second bottom plate 112 and move the fourth arm unit (not illustrated) to move the snow removing unit (not illustrated). The movement of the third arm unit (not illustrated) by the third driving unit (not illustrated) and the movement of the fourth arm unit (not illustrated) by the fourth driving unit (not illustrated) may be simultaneously performed in the same direction. The fourth driving unit (not illustrated) may not move the fourth arm unit (not illustrated) while the third driving unit (not illustrated) reciprocates the third arm unit (not illustrated) once. The third driving unit (not illustrated) may not move the third arm unit (not illustrated) while the fourth driving unit (not illustrated) reciprocates the fourth arm unit (not illustrated) once.

According to the embodiment of the present application, the device 100 for measuring the amount of snowfall may further include a control unit (not illustrated) configured to control the driving unit (not illustrated) and the image capturing unit 130.

For example, the control unit (not illustrated) may control the driving unit (not illustrated) so that a piston unit (not illustrated) included in the driving unit (not illustrated) is inserted into a cylinder unit (not illustrated) included in the driving unit (not illustrated) or the piston unit (not illustrated) is extended from the cylinder unit (not illustrated). The control unit (not illustrated) may control the image capturing unit 130 so that the image capturing unit 130 captures an image of the bottom plate 110 and the graduated ruler 120. The control unit (not illustrated) may capture an image of the bottom plate 110 by controlling the image capturing unit 130. After the image capturing unit 130 captures the image of the graduated ruler 120 and the upper portion of the snow deposited on the bottom plate 110, the control unit (not illustrated) moves the arm unit (not illustrated) connected to the driving unit (not illustrated) by controlling the driving unit (not illustrated), such that the snow removing unit (not illustrated) connected to the arm unit (not illustrated) may push out the snow to the outside of the bottom plate 110 while moving from one side to the other side of the bottom plate 110. The control unit (not illustrated) may allow the image capturing unit 130 to capture an image of the bottom plate 110, the graduated ruler 120, and the snow deposited on the bottom plate 110 for a preset time. The control unit (not illustrated) may control the driving unit (not illustrated) so that the snow removing unit (not illustrated) moves from one side to the other side of the upper portion of the bottom plate 110 a preset number of times for a preset time. The control unit (not illustrated) may control the image capturing unit 130 and the snow removing unit (not illustrated) so that the image capturing unit 130 captures images of a process in which the snow removing unit (not illustrated) removes the deposited snow.

In addition, the control unit (not illustrated) may perform control to stop the second driving unit (not illustrated) while the first driving unit (not illustrated) operates the preset number of times for the preset time. The control unit (not illustrated) may perform control to stop the first driving unit (not illustrated) while the second driving unit (not illustrated) operates the preset number of times for the preset time. The control unit (not illustrated) may perform control to move the first driving unit (not illustrated) and the second driving unit (not illustrated) simultaneously in the same direction.

In addition, the control unit (not illustrated) may perform control to stop the fourth driving unit (not illustrated) while the third driving unit (not illustrated) operates the preset number of times for the preset time. The control unit (not illustrated) may perform control to stop the third driving unit (not illustrated) while the fourth driving unit (not illustrated) operates the preset number of times for the preset time. The control unit (not illustrated) may perform control to move the third driving unit (not illustrated) and the fourth driving unit (not illustrated) simultaneously in the same direction.

According to the embodiment of the present application, the device 100 for measuring the amount of snowfall may further include the control unit (not illustrated) configured to control the image capturing unit 130, the measurement unit 140, and the snow removing unit (not illustrated).

For example, the control unit (not illustrated) may capture an image of the bottom plate 110 by controlling the image capturing unit 130. After the image capturing unit 130 captures the image of the graduated ruler 120 and the upper portion of the snow deposited on the bottom plate 110, the control unit (not illustrated) moves the arm unit (not illustrated) connected to the driving unit (not illustrated) by controlling the driving unit (not illustrated), such that the snow removing unit (not illustrated) connected to the arm unit (not illustrated) may push out the snow to the outside of the bottom plate 110 while moving from one side to the other side of the bottom plate 110. Further, the control unit (not illustrated) may control the driving unit (not illustrated) so that the snow removing unit (not illustrated) reciprocates from one side to the other side of the upper portion of the bottom plate 110 until the amount of snowfall on the bottom plate 110, which is measured by the measurement unit 140 by being controlled by the control unit (not illustrated), becomes 0 cm.

According to the embodiment of the present application, the control unit (not illustrated) may stop the operation of the snow removing unit (not illustrated) so that the snow is deposited for a first time interval. Further, the control unit (not illustrated) may operate the snow removing unit (not illustrated) so that the snow removing unit (not illustrated) pushes out the deposited snow for a second time interval.

For example, the control unit (not illustrated) may stop the operation of the first driving unit (not illustrated) and the operation of the second driving unit (not illustrated) so that snow is deposited for the first time interval. Further, the control unit (not illustrated) may perform control to operate the first driving unit (not illustrated) or the second driving unit (not illustrated) or simultaneously operate both the first driving unit (not illustrated) and the second driving unit (not illustrated) in the same direction so that the snow removing unit (not illustrated) pushes out the snow deposited on the bottom plate 110 for the second time interval. For example, the first time interval may be three hours.

In addition, the control unit (not illustrated) may stop the operation of the third driving unit (not illustrated) and the operation of the fourth driving unit (not illustrated) so that snow is deposited for a third time interval. Further, the control unit (not illustrated) may perform control to operate the third driving unit (not illustrated) or the fourth driving unit (not illustrated) or simultaneously operate both the third driving unit (not illustrated) and the fourth driving unit (not illustrated) in the same direction so that the snow removing unit (not illustrated) pushes out the snow deposited on the bottom plate 110 for a fourth time interval. For example, the third time interval may be three hours.

According to the embodiment of the present application, the device 100 for measuring the amount of snowfall may further include a determination unit (not illustrated) configured to determine whether snow begins to be deposited.

For example, the determination unit (not illustrated) may determine whether snow begins to be deposited on the first bottom plate 111 or the second bottom plate 112 by using at least one of various sensors such as a pressure sensor, a contact recognition sensor, and a temperature sensor.

According to the embodiment of the present application, the image capturing unit 130 may capture an image of the upper portion of the deposited snow and the graduated ruler 120 based on the determination result.

For example, when the determination unit (not illustrated) determines that snow begins to be deposited on the upper portion of the bottom plate 110, the image capturing unit 130 may capture an image of the upper portion of the deposited snow and the graduated ruler 120. When the determination unit (not illustrated) determines that snow does not begin to be deposited on the bottom plate 110, the image capturing unit 130 may capture an image of the bottom plate 110 and the graduated ruler 120.

According to the embodiment of the present application, the determination unit (not illustrated) may determine whether snow begins to be deposited based on information on first image capturing.

For example, the determination unit (not illustrated) may determine that snow begins to be deposited when the presence of snow on the bottom plate 110 is recognized, instead of a state of the bottom plate 110 immediately after the snow is removed, based on information on the first image capturing in which the image capturing unit 130 captures the image of the bottom plate 110 and the graduated ruler 120.

According to the embodiment of the present application, the measurement unit 140 may measure the amount of snowfall based on information on second image capturing.

For example, the measurement unit 140 may measure the amount of snowfall based on information on the second image capturing in which the image capturing unit 130 captures the image of the graduated ruler 120 and the upper portion of the snow deposited on the upper portion of the bottom plate 110.

According to the embodiment of the present application, the determination unit (not illustrated) may use the sensor to determine whether snow begins to be deposited.

For example, the determination unit (not illustrated) may determine whether snow begins to be deposited on the bottom plate 110 by using one or more of various sensors such as a pressure sensor, a contact recognition sensor, and a temperature sensor.

According to the embodiment of the present application, the device 100 for measuring the amount of snowfall may further include the control unit (not illustrated) configured to control the image capturing unit 130, the measurement unit 140, and the snow removing unit (not illustrated) based on information received from the external snowfall amount measuring device (not illustrated).

For example, based on information received from one or more external snowfall amount measuring devices (not illustrated), the control unit (not illustrated) may perform control to operate the snow removing unit (not illustrated) to remove the remaining snow on the bottom plate 110 when the information received from the external snowfall amount measuring device (not illustrated) within a preset distance is information indicating that snow begins to fall.

According to the embodiment of the present application, the control unit (not illustrated) may control the image capturing unit 130, the measurement unit 140, and the snow removing unit (not illustrated) based on whether the external snowfall amount measuring device (not illustrated) operates or information on the amount of outside snowfall of the external snowfall amount measuring device (not illustrated).

For example, when the control unit (not illustrated) receives information indicating that the external snowfall amount measuring device (not illustrated) within a preset distance has operated, the control unit (not illustrated) may control the image capturing unit 130, the measurement unit 140, and the snow removing unit (not illustrated). When the control unit (not illustrated) receives information on the amount of outside snowfall equal to or larger than a preset critical value from the external snowfall amount measuring device (not illustrated), the control unit (not illustrated) may control the image capturing unit 130, the measurement unit 140, and the snow removing unit (not illustrated).

According to the embodiment of the present application, the driving unit (not illustrated) may include: the cylinder unit (not illustrated); and the piston unit (not illustrated) positioned in the cylinder unit (not illustrated) and configured to be moved forward or rearward within a stroke range by a hydraulic pressure.

For example, the first driving unit (not illustrated) may include: a first cylinder unit (not illustrated); and a first piston unit (not illustrated) positioned in the first cylinder unit (not illustrated) and configured to be moved forward or rearward within a stroke range by a hydraulic pressure. The second driving unit (not illustrated) may include: a second cylinder unit (not illustrated); and a second piston unit (not illustrated) positioned in the second cylinder unit (not illustrated) and configured to be moved forward or rearward within a stroke range by a hydraulic pressure. A dimension of the first cylinder unit (not illustrated) may be identical to a dimension of the second cylinder unit (not illustrated). A dimension of the first piston unit (not illustrated) may be identical to a dimension of the second piston unit (not illustrated).

In addition, the third driving unit (not illustrated) may include: a third cylinder unit (not illustrated); and a third piston unit (not illustrated) positioned in the third cylinder unit (not illustrated) and configured to be moved forward or rearward within a stroke range by a hydraulic pressure. The fourth driving unit (not illustrated) may include: a fourth cylinder unit (not illustrated); and a fourth piston unit (not illustrated) positioned in the fourth cylinder unit (not illustrated) and configured to be moved forward or rearward within a stroke range by a hydraulic pressure. A dimension of the third cylinder unit (not illustrated) may be identical to a dimension of the fourth cylinder unit (not illustrated). A dimension of the third piston unit (not illustrated) may be identical to a dimension of the fourth piston unit (not illustrated).

According to the embodiment of the present application, the other side end of the arm unit (not illustrated) may be connected to the piston unit (not illustrated).

For example, one end of the first arm unit (not illustrated), which is not connected to the snow removing unit (not illustrated), may be connected to the first piston unit (not illustrated). One end of the second arm unit (not illustrated), which is not connected to the snow removing unit 150, may be connected to the second piston unit (not illustrated). In addition, one end of the third arm unit (not illustrated), which is not connected to the snow removing unit (not illustrated), may be connected to the third piston unit (not illustrated). One end of the fourth arm unit (not illustrated), which is not connected to the snow removing unit (not illustrated), may be connected to the fourth piston unit (not illustrated).

Figure 2B:
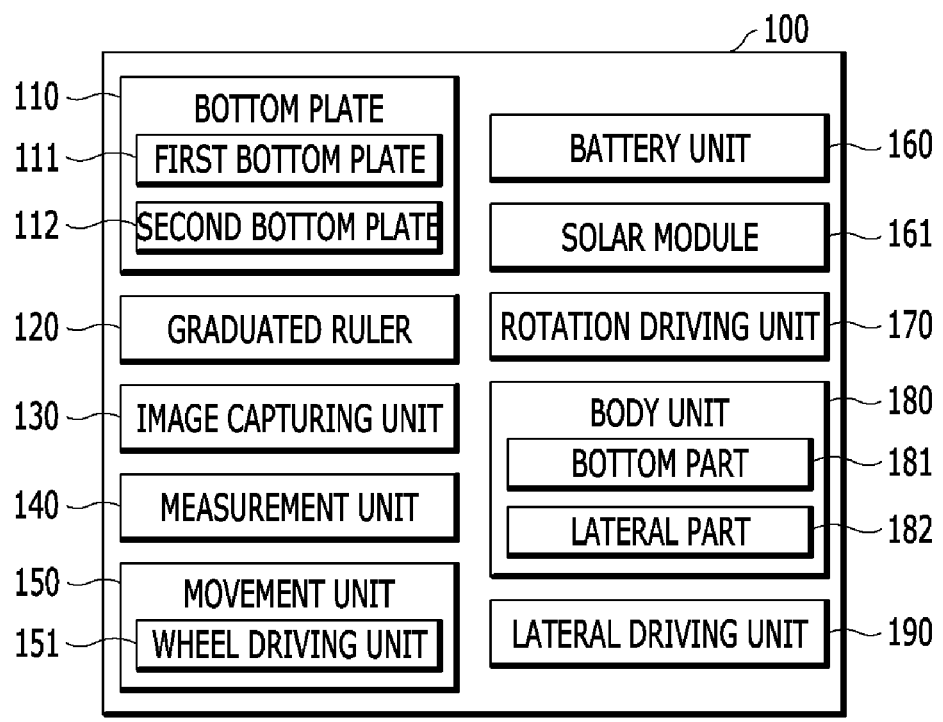
FIG. 2B is a schematic block diagram related to expanded components of the device for measuring the amount of snowfall according to the embodiment of the present application.

FIG. 2B is a schematic block diagram related to expanded components of the device 100 for measuring the amount of snowfall according to the embodiment of the present application.

Referring to FIG. 2B, the device 100 for measuring the amount of snowfall may include: the bottom plate 110 including the first and second bottom plates 111 and 112; the graduated ruler 120; the image capturing unit 130; the measurement unit 140; the movement unit 150 including a wheel driving unit 151; the battery unit 160; the solar module 161; the rotation driving unit 170; the body unit 180 including the bottom part 181 and the lateral part 182; and the lateral driving unit 190, as the expanded components.

According to the embodiment of the present application, the movement unit 150 may include one or more wheels, and the wheel driving unit 151 configured to drive the wheels.

For example, in the device 100 for measuring the amount of snowfall, a pair of wheels may be provided at a foremost side, a pair of wheels may be provided at a rearmost side, and a plurality of pairs of wheels may be provided between the pair of wheels provided at the foremost side and the pair of wheels provided at the rearmost side. The device 100 for measuring the amount of snowfall may have one or more pairs of wheels disposed on an extension line of the same rotation axis. When the remaining battery power exceeds a preset critical value, the wheel driving unit 151 may drive the wheels in a front-wheel drive manner. When the remaining battery power is the preset critical value or less, the wheel driving unit 151 may drive the wheels in a two-wheel drive manner.

According to the embodiment of the present application, the device 100 for measuring the amount of snowfall may further include the battery unit 160 configured to supply power to at least one of the image capturing unit 130, the measurement unit 140, and the movement unit 150.

For example, the battery unit 160 may supply power to at least one of the image capturing unit 130, the measurement unit 140, the movement unit 150, the rotation driving unit 170, and the lateral driving unit 190. When the remaining battery power is the preset critical value or less, the battery unit 160 may cut off the supply of power to at least one of the image capturing unit 130, the measurement unit 140, the movement unit 150, the rotation driving unit 170, and the lateral driving unit 190.

Figure 3:
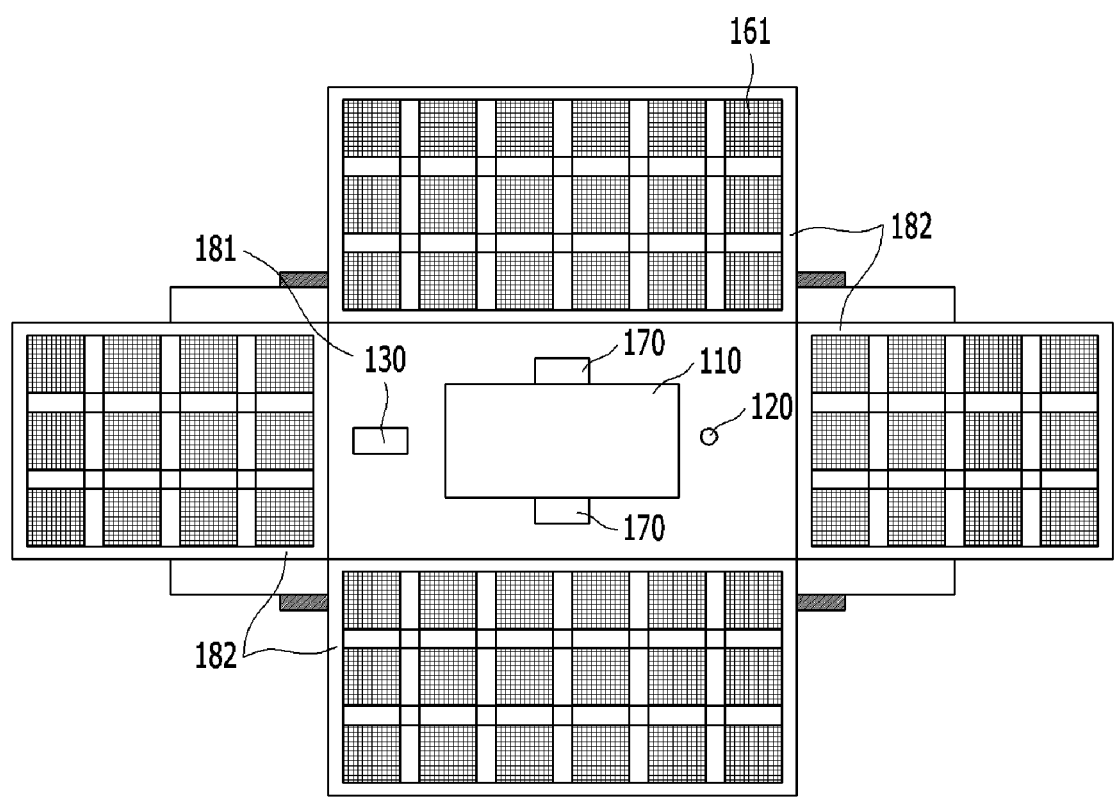
FIG. 3 is a view illustrating a solar module, a bottom plate, a rotation driving unit, an image capturing unit, and a graduated ruler of the device for measuring the amount of snowfall according to the embodiment of the present application.

FIG. 3 is a view illustrating the solar module 161, the bottom plate 110, the rotation driving unit 170, the image capturing unit 130, and the graduated ruler 120 of the device 100 for measuring the amount of snowfall according to the embodiment of the present application.

Referring to FIG. 3, the lateral driving unit 190 may rotate the lateral part 182 so that an angle between the lateral part 182 and the bottom part 181 of the device 100 for measuring the amount of snowfall becomes 180 degrees, such that the solar module 161 provided on the lateral part 182 may be positioned to be directed upward. The rotation driving unit 170, the graduated ruler 120, and the image capturing unit 130 may be provided on the upper portion of the bottom part 181, and the bottom plate 110 may be provided on the rotation driving unit 170.

According to the embodiment of the present application, the device 100 for measuring the amount of snowfall may further include one or more solar modules 161.

For example, one or more solar modules 161 may be respectively provided on the lateral parts 182 of the device 100 for measuring the amount of snowfall. Examples of the solar module 161 may include an 80W solar module, a 100W solar module, a 130W solar module, a 250W solar module, a 300W solar module, and a 360W solar module, and the solar modules 161 may have various sizes.

According to the embodiment of the present application, the battery unit 160 may be charged by the solar module 161.

For example, when the time and space, which enable the solar module 161 to use solar heat, is provided, the battery unit 160 may be charged by the solar module 161. When the time and space, which enable the solar module 161 to use solar heat, is not provided, the battery unit 160 may be charged by one or more lithium-ion batteries provided in the device 100 for measuring the amount of snowfall. When the battery unit 160 has the remaining power that only allows the device 100 for measuring the amount of snowfall to move to a spot of an automatic charging system closest to the current position, the device 100 for measuring the amount of snowfall may immediately stop the operations of capturing an image, performing the measurement, and removing the snow and then move to the spot of the automatic charging system. When the battery unit 160 has the remaining power lower than the power that enables the device 100 for measuring the amount of snowfall to move to the spot of the automatic charging system closest to the current position, the device 100 for measuring the amount of snowfall may transmit a message including the current position and the remaining power to the user terminal (not illustrated).

Figure 4A:
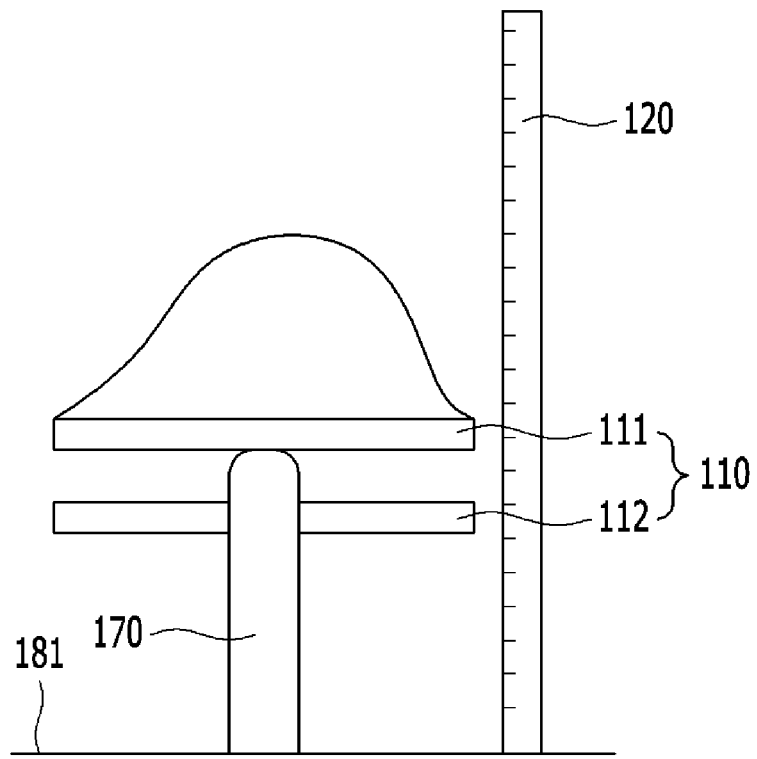
FIG. 4A is a view illustrating a step before the bottom plate of the device for measuring the amount of snowfall according to the embodiment of the present application is rotated.

FIG. 4A is a view illustrating a step before the bottom plate 110 of the device 100 for measuring the amount of snowfall according to the embodiment of the present application is rotated.

Referring to FIG. 4A, in the device 100 for measuring the amount of snowfall, the rotation driving unit 170 and the graduated ruler 120 may be provided on the upper surface of the bottom part 181, and the first and second bottom plates 111 and 112 may be disposed on the rotation driving unit 170 and provided symmetrically with respect to an axis of the rotation driving unit 170. When the deposited snow exists on the upper portion of the first bottom plate 111 after the observation is ended, the rotation driving unit 170 may rotate the first and second bottom plates 111 and 112 in a preset direction and at a preset speed, thereby dropping the deposited snow from the first bottom plate 111.

Figure 4B:
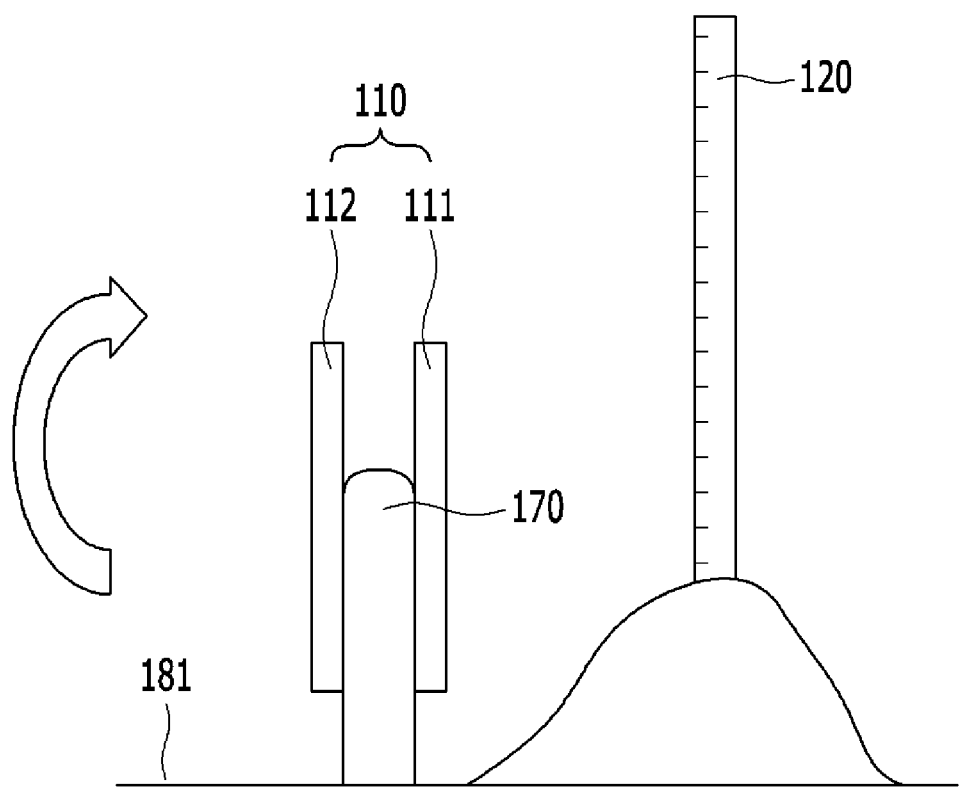
FIG. 4B is a view illustrating a step while the bottom plate of the device for measuring the amount of snowfall according to the embodiment of the present application is rotated.

FIG. 4B is a view illustrating a step while the bottom plate 110 of the device 100 for measuring the amount of snowfall according to the embodiment of the present application is rotated.

Referring to FIG. 4B, as described above, the rotation driving unit 170 may rotate the first and second bottom plates 111 and 112 in the preset direction and at the preset speed, thereby dropping the deposited snow from the first bottom plate 111 by centrifugal force and gravity.

Figure 4C:
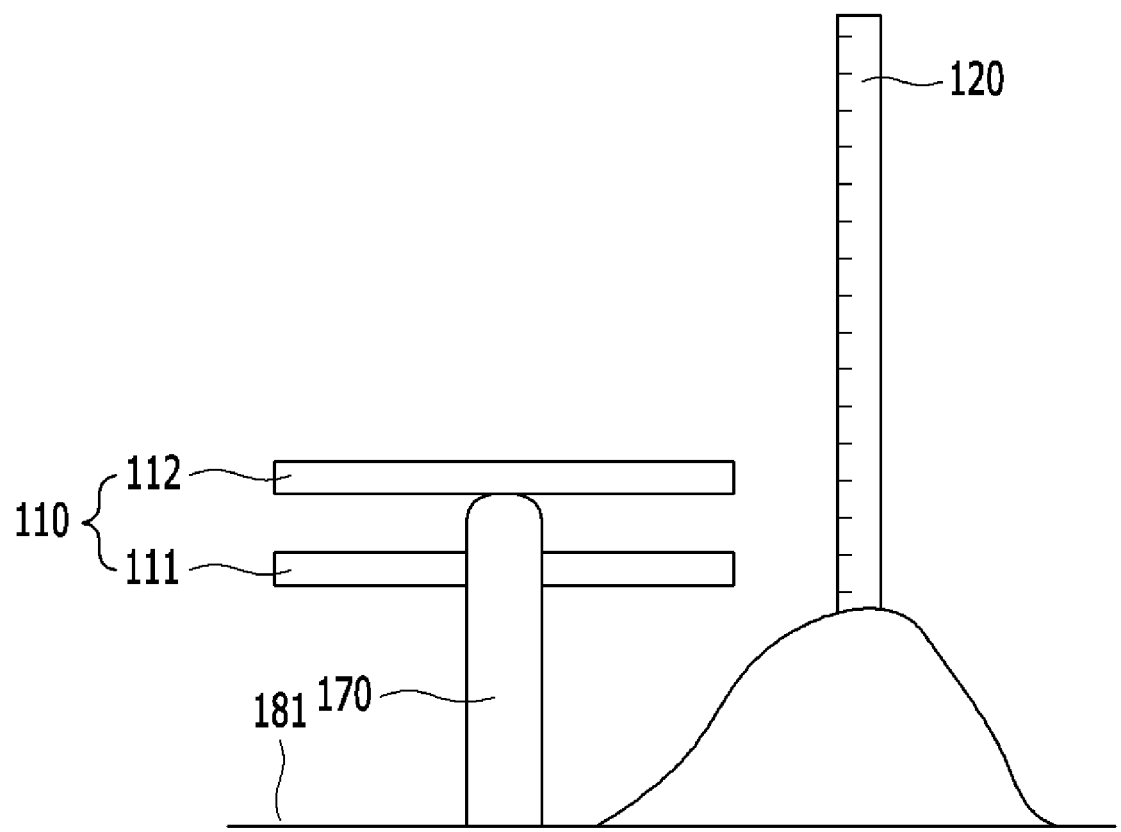
FIG. 4C is a view illustrating a step after the bottom plate of the device for measuring the amount of snowfall according to the embodiment of the present application is completely rotated.

FIG. 4C is a view illustrating a step after the bottom plate 110 of the device 100 for measuring the amount of snowfall according to the embodiment of the present application is completely rotated.

Referring to FIG. 4C, the rotation driving unit 170 rotates the previous first and second bottom plates 111 and 112 by 180 degrees, such that the first bottom plate 111, which has been used for the previous observation, may be positioned below the second bottom plate 112, and the second bottom plate 112, which has not been used for the previous observation, may be used as the bottom plate 110 that will be used for new observation.

According to the embodiment of the present application, the device 100 for measuring the amount of snowfall may further include the rotation driving unit 170 configured to rotate the bottom plate 110 about the rotation axis so that the snow deposited on the bottom plate 110 falls downward.

For example, the rotation driving unit 170 may rotate the first and second bottom plates 111 and 112 in the preset direction and at the preset speed. In the case in which the first bottom plate 111 has been used for the previous observation, the rotation driving unit 170 rotates the first and second bottom plates 111 and 112 by 180 degrees about the rotation axis in the preset direction and at the preset speed, such that the second bottom plate 112, which has not been used for the previous observation, may be used as the bottom plate that will be used for the new observation.

According to the embodiment of the present application, the device 100 for measuring the amount of snowfall may further include the body unit 180 including the bottom part 181 and the plurality of lateral parts 182 extending from the bottom part 181, the body unit 180 being configured to accommodate snow falling in the space defined by the bottom part 181 and the lateral parts 182.

For example, the bottom part 181 may be flat so that the rotation driving unit 170, the graduated ruler 120, and the image capturing unit 130 may appropriately stand vertically. The bottom part 181 may have a circular or polygonal shape. The bottom part 181 may include a contact sensor, a temperature sensor, or the like to detect snow deposited on an upper portion of the bottom part 181. A heating wire may be provided in the bottom part 181 of the device 100 for measuring the amount of snowfall and melt the snow dropped onto the bottom part 181 by the rotation of the bottom plate 110. A vibration member may be embedded in the bottom part 181 and apply vibration to remove the snow deposited on the bottom part 181. When the number of sides of the bottom part 181 is n, the number of rotation axes of the lateral driving unit 190 may be n, and the number of lateral parts 182 may be n. The bottom part 181 may include an openable or closable drain port (not illustrated) so that melted snow water may be discharged to the outside of the body unit 180.

Figure 5A:
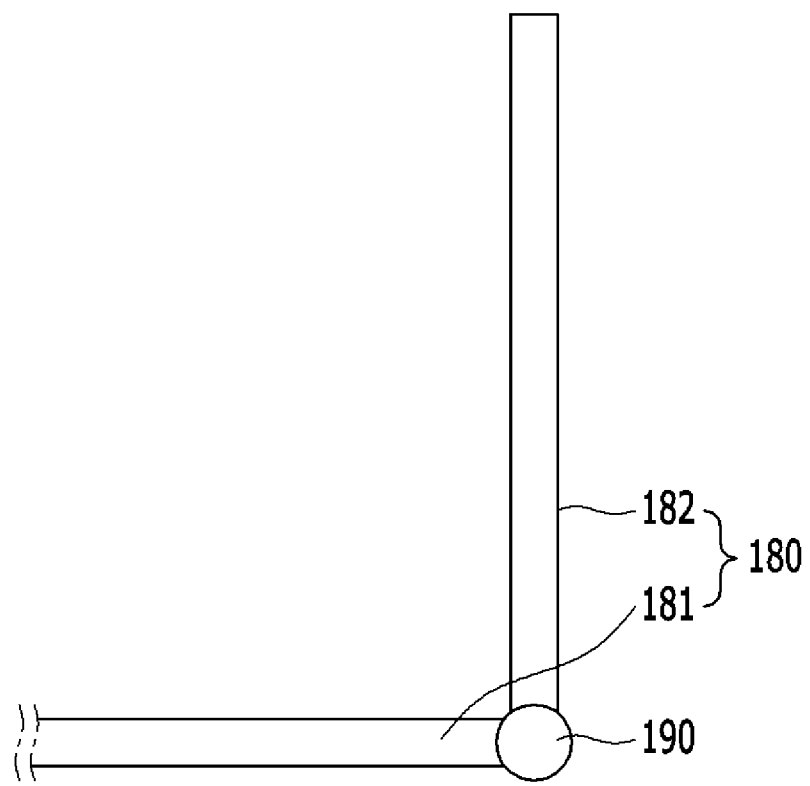
FIG. 5A is a view illustrating a state in which a lateral part and a bottom part of the device for measuring the amount of snowfall according to the embodiment of the present application are perpendicular to each other.

FIG. 5A is a view illustrating a state in which the lateral part 182 and the bottom part 181 of the device 100 for measuring the amount of snowfall according to the embodiment of the present application are perpendicular to each other.

Referring to FIG. 5A, a minimum angle between the lateral part 182 and the bottom part 181 of the device 100 for measuring the amount of snowfall may be 90°. For example, the lateral driving unit 190 may operate all the plurality of lateral parts 182 provided on the bottom part 181 so that all the plurality of lateral parts 182 are perpendicular to the bottom part 181 until after a second unit point in time at which the measurement unit 140 completely measures the amount of snowfall from before a first unit point in time at which snow is deposited on the bottom plate 110 so that the image of the snow is captured and the amount of snowfall is measured. When snow is deposited on the bottom plate 110 in the state in which all the plurality of lateral parts 182 provided on the bottom part 181 are perpendicular to the bottom part 181, the lateral parts 182 maximally block factors, such as wind, that hinder the observation of the deposited snow. Therefore, it is possible to comparatively more accurately measure the amount of snowfall.

Figure 5B:
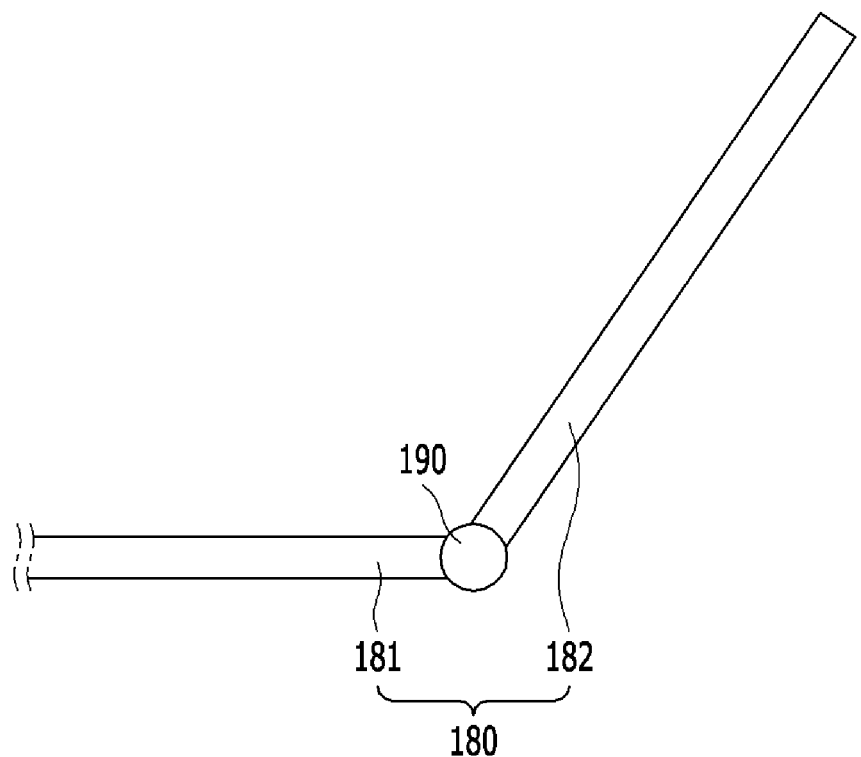
FIG. 5B is a view illustrating a state in which the lateral part and the bottom part of the device for measuring the amount of snowfall according to the embodiment of the present application define an obtuse angle.

FIG. 5B is a view illustrating a state in which the lateral part 182 and the bottom part 181 of the device 100 for measuring the amount of snowfall according to the embodiment of the present application define an obtuse angle.

Referring to FIG. 5B, the angle between the lateral part 182 and the bottom part 181 of the device 100 for measuring the amount of snowfall may be changed by the lateral driving unit 190.

Figure 5C:
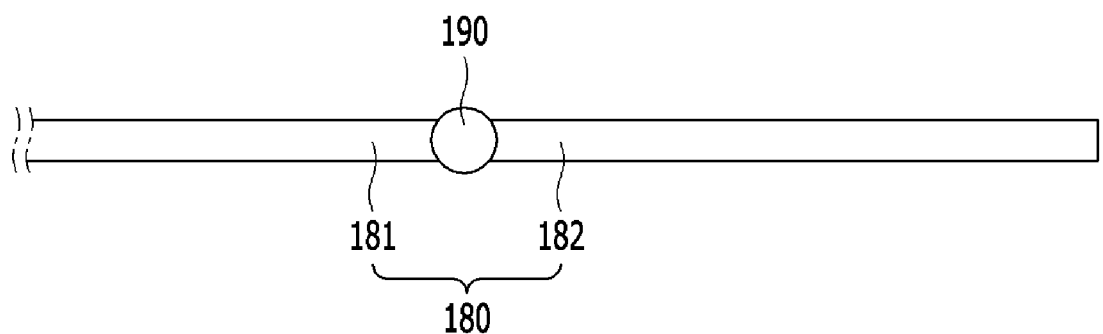
FIG. 5C is a view illustrating a state in which the lateral part and the bottom part of the device for measuring the amount of snowfall according to the embodiment of the present application are horizontally disposed.

FIG. 5C is a view illustrating a state in which the lateral part 182 and the bottom part 181 of the device 100 for measuring the amount of snowfall according to the embodiment of the present application are horizontally disposed.

Referring to FIG. 5C, a maximum angle between the lateral part 182 and the bottom part 181 of the device 100 for measuring the amount of snowfall may be 180°.

According to the embodiment of the present application, the device 100 for measuring the amount of snowfall may further include the lateral driving unit 190 configured to rotate the lateral part 182 in the preset direction and by the preset angle about the tangential line between the bottom part 181 and the lateral part 182.

For example, the lateral driving unit 190 may rotate the lateral parts 182 about the rotation axes so that the angle between the bottom part 181 and each of the plurality of lateral parts 182 is any one angle of 90° to 180°. The device 100 for measuring the amount of snowfall may further include a sunlight calculation unit (not illustrated). The sunlight calculation unit (not illustrated) may calculate information on an incident angle of sunlight entering the device 100 for measuring the amount of snowfall. Based on the calculated information on the incident angle of the sunlight, the lateral driving unit 190 may adjust the angle between the bottom part 181 and the lateral part 182 to an angle of 90° to 180° so that the sunlight entering the solar module 161 is perpendicular to the solar module 161 or most approximately perpendicular to the solar module 161.

Hereinafter, an operation flow of the present application will be briefly described with reference to the contents described above in detail.

Figure 6:
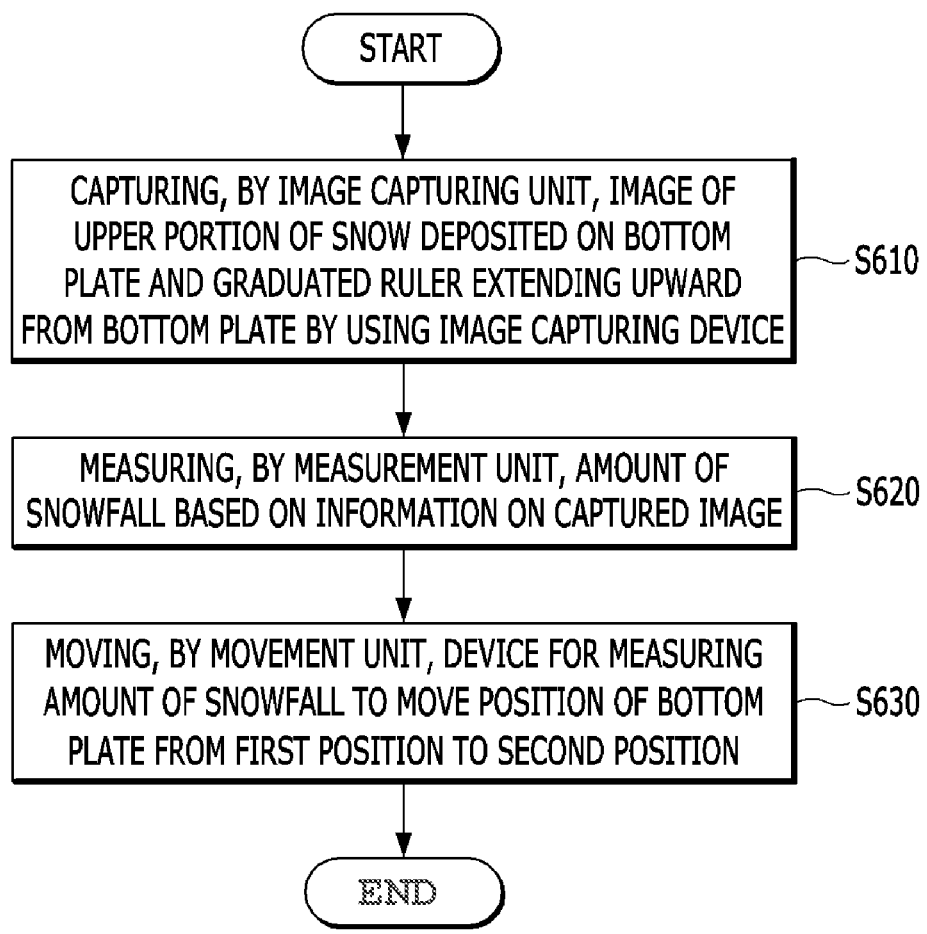
FIG. 6 is an operational flowchart of a method of controlling the device for measuring the amount of snowfall according to the embodiment of the present application.

FIG. 6 is an operational flowchart of a method of calculating the amount of snowfall according to the embodiment of the present application.

The method of calculating the amount of snowfall illustrated in FIG. 6 may be performed by the above-mentioned snowfall amount calculation device. Therefore, the contents described regarding the snowfall amount calculation device may be equally applied to the description of the method of calculating the amount of snowfall even though the contents are omitted.

In step S610, the method of calculating the amount of snowfall may include a step of capturing an image of the upper portion of the snow deposited on the bottom plate 110 and the graduated ruler 120 extending upward from the bottom plate 110 by using the image capturing device.

In step S620, the method of calculating the amount of snowfall may include a step of measuring the amount of snowfall based on information on the captured image.

In step S630, the method of calculating the amount of snowfall may include a step of moving, by the movement unit 150, the device 100 for measuring the amount of snowfall to move the position of the bottom plate 110 from the first position to the second position.

In the above-mentioned description, steps S610, S620, and S630 may be divided into additional steps or combined into fewer steps according to the embodiment of the present application. In addition, some steps may be eliminated as necessary. The order of the steps may be changed.

The method of measuring the amount of snowfall according to the embodiment of the present application may be implemented in the form of program commands executable by means of various computer means and then written in a computer-readable recording medium. The computer-readable medium may include program instructions, data files, data structures, or the like, in a stand-alone form or in a combination thereof. The program instructions recorded in the medium may be specially designed and configured for the present disclosure or may be known and available to those skilled in computer software. Examples of the computer-readable recording medium may include magnetic media, such as a hard disk, a floppy disk and a magnetic tape, optical media, such as CD-ROM and DVD, magneto-optical media, such as a floptical disk, and hardware devices, such as ROM, RAM and flash memory, which are specifically configured to store and run program instructions. Examples of the program instructions may include machine codes made by, for example, a compiler, as well as high-language codes that may be executed by an electronic data processing device, for example, a computer, by using an interpreter. The above-mentioned hardware devices may be configured to operate as one or more software modules in order to perform the operation of the present disclosure, and the opposite is also possible.

In addition, the method of measuring the amount of snowfall may also be implemented in the form of a computer program or application stored in a recording medium and executed by a computer.

It will be appreciated that the embodiments of the present application have been described above for purposes of illustration, and those skilled in the art may understand that the present application may be easily modified in other specific forms without changing the technical spirit or the essential features of the present application. Therefore, it should be understood that the above-described embodiments are illustrative in all aspects and do not limit the present disclosure. For example, each component described as a single type may be carried out in a distributed manner.

Likewise, components described as a distributed type can be carried out in a combined type.

The scope of the present application is represented by the claims to be described below rather than the detailed description, and it should be interpreted that the meaning and scope of the claims and all the changes or modified forms derived from the equivalent concepts thereto fall within the scope of the present application.

What is claimed is:

1. A device for measuring the amount of snowfall, the device comprising:
    a body unit having a bottom part and a lateral part extending from the bottom part,
    a bottom plate having a first bottom plate and a second bottom plate parallel to the first bottom plate and spaced apart from the first bottom plate;
    a rotation driving unit disposed on the bottom part, the bottom plate being rotatably installed in the rotation driving unit, wherein the rotation driving unit is configured to rotate the bottom plate so that positions of the first bottom plate and the second bottom plate are switched over with each other;
    a graduated ruler disposed on the bottom part and extending upward above the bottom plate;
    an image capturing unit disposed on the bottom part and having an image capturing device, the image capturing device being configured to capture an image of the graduated ruler and an upper portion of snow deposited on the bottom plate to generate an captured image; and
    a measurement unit configured to measure an amount of the snow deposited on the bottom plate based on information on the captured image.

2. The device of claim 1, furthering comprising a movement unit configured to move the bottom plate from a first position to a second position, the movement unit comprising:
    two or more wheels; and
    a wheel driving unit configured to drive the two or more wheels.

3. The device of claim 1, further comprising:
    a battery unit; and
    at least one solar module to charge the battery unit.

4. The device of claim 3, further comprising:
    a lateral driving unit configured to rotate the lateral part in a preset direction and by a preset angle with respect to the bottom part,
    wherein the at least one solar module is disposed on the lateral part.

5. The device of claim 1, wherein the rotation driving unit is configured to rotate the bottom plate at a preset speed to be able to remove the snow disposed on the bottom plate.

6. The device of claim 1, further comprising:
    a lateral driving unit configured to rotate the lateral part in a preset direction and by a preset angle with respect to the bottom part.

* * * * *